United States Patent [19]

Brown

[11] Patent Number: 4,695,755
[45] Date of Patent: Sep. 22, 1987

[54] COLLAR FOR THE COMMUTATOR OF AN AUTOMOTIVE STARTER

[76] Inventor: Chester Brown, 133-20 91st Ave., Richmond Hill, N.Y. 11418

[21] Appl. No.: 929,612

[22] Filed: Nov. 12, 1986

[51] Int. Cl.[4] ............ H02K 13/10; H01R 39/16
[52] U.S. Cl. ........................... 310/236; 384/371
[58] Field of Search ............ 310/90, 233, 235, 236, 310/228; 384/368, 370, 371; 29/597

[56] References Cited

U.S. PATENT DOCUMENTS

| | | | |
|---|---|---|---|
| 228,545 | 6/1880 | Maxim | 310/236 |
| 1,120,344 | 12/1914 | Templin | 384/371 |
| 1,826,443 | 10/1931 | Aufiero et al. | 310/235 |
| 4,152,614 | 5/1979 | Noguchi et al. | 310/233 |
| 4,587,861 | 5/1986 | Morishita | 310/83 |

Primary Examiner—Patrick R. Salce
Assistant Examiner—D. L. Rebsch
Attorney, Agent, or Firm—Nicholas J. Garofalo

[57] ABSTRACT

The armature of an automotive starter motor has a protective collar for its commutator. The collar has an annular disc body that is bonded to the rear wall of the commutator, and it has a projecting rim which overlays the marginal free ends of the bars of the commutator so as to restrain them from a tendency to peel or lift away under the strong forces developed as the armature is rotated in cranking a motor vehicle engine. The body of the collar also has a rearwardly extending hub provided with grease-filled cavities, whereby the hub serves as a lubricated thrust washer and spacer for the armature relative to the end frame of the starter's housing, as the armature rotates.

4 Claims, 5 Drawing Figures

COLLAR FOR THE COMMUTATOR OF AN AUTOMOTIVE STARTER

BACKGROUND OF THE INVENTION

This invention presents new and useful improvements in the armature of an electrical motor. More particularly, it is directed to the provision of a protective collar for the bars of the commutator of an automotive starter motor.

The armature is the rotating member of the starter; and the commutator is that part of the armature upon which brushes ride and serve to conduct current from a battery to the windings of the armature, whereby rotation of the armature is effected.

The starter is associated with an automotive engine in such manner that rotation of the armature is transmitted through a flywheel to rotate the piston crankshaft from a condition of rest to a speed at which the engine will commence to rotate on its own. When this occurs, associated mechanism in the starter automatically functions to stop further rotation of the armature.

The high speed at which the armature is caused to run and the accompanying high torque required to effect turning and starting of the engine develop high centrifugal forces and other negative forces that have a damaging effect upon the commutator. In this respect, the commutator includes a succession of parallel bars about its periphery. These are insulated from one another and from the armature shaft by insulating material in which they are embedded. The bars are of thin copper sheeting, and are subject to being further thinned by the rubbing action of the brushes. The strong negative forces imparted to the commutator every time the armature is actuated to start the engine tend to urge the free ends of the bars away from the commutator and out of the insulation. In due time the free ends peel or lift upwardly from the commutator and become damaged so as to require repair. This may mean removal and replacement of the damaged commutator or, because of the expense required for repairs, it may mean discarding the whole armature and replacing it with a new one.

Accordingly, the general object of this invention is to provide inexpensive means for application to the commutator which will resist the tendency of the free ends of the bars to peel and will, accordingly, restrain them in place.

A more specific object of the invention is to provide a collar which can be mounted to the commutator and seated over the free ends of the bars, whereby the free ends of the bars will be held firmly in place and restrained from lifting or peeling away.

A further object of the invention is to provide a collar which will not only serve to retain the bars in place, but will also serve as a lubricated thrust washer for the commutator relative to the end frame of the starter's housing.

The collar is molded of firm electrical insulating material, such as a suitable plastic, and it is adapted to be securely seated in a fixed position upon the commutator by a suitable adhesive so that it will rotate with the commutator as a unit and integral part thereof.

The foregoing objects, features and advantages of the invention, as well as others, will appear more fully hereinafter from a consideration of the detailed description which follows, taken together with the accompanying drawing wherein an embodiment of the invention is illustrated. It is, however, to be expressly understood that the drawing is for purposes of illustration and description, and it is not to be construed as defining the limits of the invention.

DETAILED DESCRIPTION OF THE INVENTION

Figure 1:
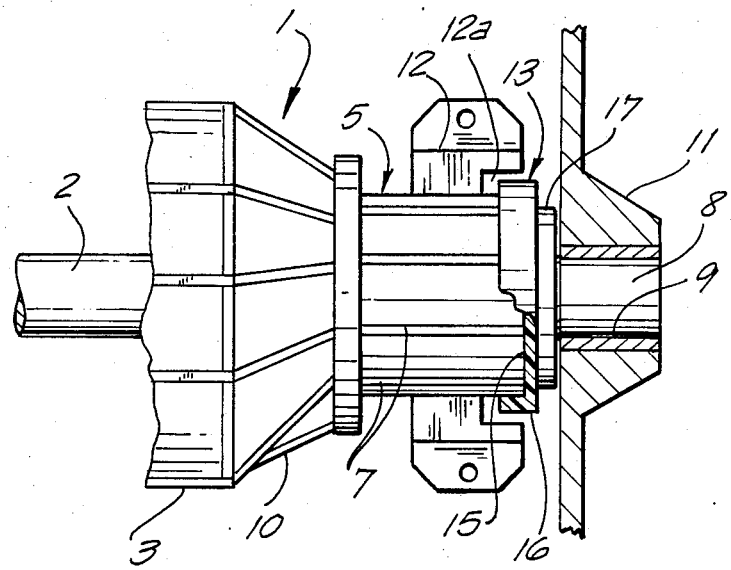
FIG. 1 is a side view of a rear portion of the armature and housing of an automotive starter motor showing a commutator over the free ends of the bars of which a collar embodying the invention is mounted.
Figure 2:
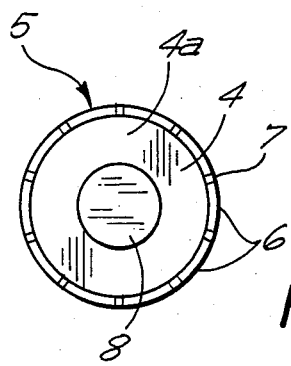
FIG. 2 is a view of the rear end face of the commutator itself with the collar removed and showing the free ends of the bars.
Figure 3:
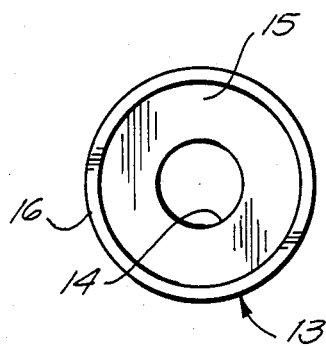
FIG. 3 is an enlarged view of the collar apart from the commutator and showing its inner face.
Figure 4:
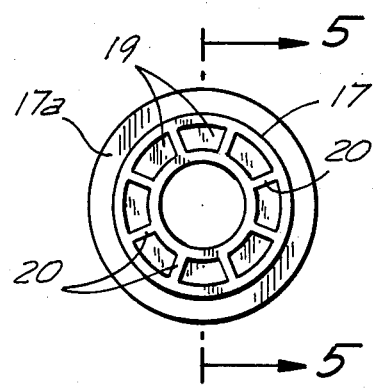
FIG. 4 is a plan view showing the rear outer face of the collar.
Figure 5:
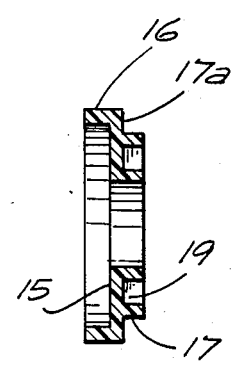
FIG. 5 is a section on line 5—5 of FIG. 4.

Reference is now directed to the several Figures of the drawing, wherein there is shown an armature 1 of an automotive engine starter. Only so much of the armature and its housing is shown as will enable a clear understanding of the invention. The armature includes a shaft 2 upon which is mounted the laminated core 3 of the armature. On the shaft rearwardly of the core is mounted a hub or cylindrical body 4 which defines the supporting body of a commutator 5. The commutator includes a group of elongated bars 6 extending in parallel relation to each other for the length of the hub and closely spaced from one another about the periphery of the hub. The bars are embedded in insulating material forming the hub 4, and they are insulated from one another by narrow bands 7 of the insulating material filling the spaces between the bars. The bands are commonly called striping. The inner ends of the bars are connected with the usual windings 10 of the armature.

The armature shaft extends axially beyond the rear face 4a of the hub of the commutator to provide a stub portion or shaft 8. The stub shaft is supported for relative rotation in a bushing 9 fitted in an end frame 11 of the starter's housing, as in FIG. 1.

The bars 6 are narrow and slender, being formed of thin copper sheeting; and their embedded condition in the insulating material is relatively shallow. As earlier explained, the armature carrying the commutator rotates at high speed and with high torque delivery. The free ends of the bars of the commutator afford a relatively weak resistance to being lifted upwardly from the commutator by the strong centrifugal forces imparted to them and, in due time, they will begin to peel and lift away.

In the assembled condition of the armature in its housing, current transmitting brushes 12 abut the peripheral surfaces of the commutator bars. They function to conduct current from the associated vehicle's battery to the commutator when the starter is actuated; and they rub against the bars as the commutator rotates. The rubbing of the brushes on the bars tends to wear the bars down and to increase their tendency to peel. The brushes are seated in close proximity to the free ends of the bars. It can accordingly be seen that should any of the ends of the bars lift or peel even slightly from their normal positions they will, as the commutator rotates, strike side areas of the brushes and become twisted or otherwise damaged. Such damage often requires replacement of the commutator or, as a matter of expedience, discarding the entire armature and replacing it with a new one.

The present invention provides means for resisting the negative forces acting upon the bars of the commutator and thereby preventing the damage mentioned. This means is defined by a collar element 13. It is adapted to be received over the stub shaft 8 into abutment with the rear end face 4a of the hub of the commutator and to extend over and collar marginal free ends of the bars, as in FIG. 1. It is caused to be bonded securely in place so as to be carried about with the commutator as a unit or integral part thereof.

The collar (FIGS. 1 and 3–5) is of disc form. It has an annular body having inner and outer faces 15, 17a. It is provided with an axial hole 14 enabling it to be easily passed over the stub shaft 8 for assembly onto the commutator. The inner face 15 of the collar is flat. This enables the collar to be positioned flatly against the complementary rear end face 4a of the hub of the commutator. The periphery of the collar is defined by a narrow forwardly extending rim 16.

In the assembled condition of the collar upon the commutator, as in FIG. 1, the rim of the collar overlays a marginal peripheral end portion of each of the bars 6. The commutator's brushes are sufficiently undercut or notched at their rear underside marginal portions, as at 12a so as to allow the rim of the collar to be rotated with the commutator clear of and without contacting the brushes.

The collar is held fast to the commutator by means of a suitable bonding agent or adhesive applied to it, such as a rubber adhesive sealant, and the rim of the collar is tightly held by the adhesive down upon the bars. The collar and the adhesive with which it is bonded to the commutator are of materials capable of withstanding the usual heat developed during rotation of the commutator; and the adhered condition of the collar is strong enough to resist being loosened by the rotating forces of the commutator. The tight and snug fit of the collar upon the marginal free ends of the bars restrains them in place and prevents them from lifting or peeling away.

The collar is formed, as by molding, preferably from a suitable plastic material that gives to it a firm and nonbrittle quality. A commonly available material for this purpose is known as glass filled "Valox", as well as others affording similar characteristics.

The outer face 17a of the collar has a short rearwardly projecting hub 17 of reduced diameter. This hub serves as a combined spacer and thrust washer. It functions to abut the inner wall 21 of the starter's housing end frame 11 or a spacer element that might be positioned between the collar and the end frame.

Further, the hub 17 is sectioned in its rear end by radial ribs 20 into a group of slightly recessed cavities 19. The cavities are adapted to be filled with grease which will serve to lubricate the rear of the collar relative to the end frame 11, or an intermediate spacer, as the collar rotates with the commutator.

While an embodiment of the invention has been illustrated and described in detail, it is to be expressly understood that the invention is not limited thereto. Various changes may be made in the design and arrangement of the parts without departing from the spirit and scope of the invention, as the same will now be understood by those skilled in the art; and it is my intention, therefore, to claim the invention not only as shown and described, but also in all such forms and modifications thereof as may reasonably be construed to be within the spirit of the invention and the scope of the appended claims.

What is claimed is:

1. A collar adapted to be bonded to a commutator of an automotive starter motor for restraining thin copper bars extending longitudinally about the periphery of the commutator from peeling at their free ends and to provide lubrication between the collar and an end frame of the housing of the motor as the collar rotates with the commutator relative to the housing, wherein the collar comprises: a body of disc form provided with an axial hole whereby the collar may be passed over a stub shaft projecting axially from a rear end face of the commutator, the body having an inner flat face adapted to lie in abutment with the rear end face of the commutator, a rim about the body projecting forwardly beyond the inner flat face of the body, the rim being adapted to overlay the free ends of the bars, and a hub of reduced diameter projecting rearwardly from the body, the hub having radially extending cavities in its rear adapted to contain grease, the hub being adapted to serve as a thrust washer relative to the end frame of the housing, and the grease being adapted to serve as a lubricant for the collar as it rotates with the commutator relative to the end frame.

2. A collar as in claim 1, wherein the collar is formed of plastic material having a firm and non-brittle quality.

3. In an automotive starter motor including an end frame of a housing for the motor, a shaft supported at one end in the end frame for relative rotation, an armature having a core mounted upon the shaft, a commutator adjacent one end of the core having a body mounted upon the shaft for rotation with the shaft and having a radial rear end face in opposed relation to an inner face of the end frame, a plurality of bars of thin copper sheeting extending rearwardly for the length of the body embedded in the surface of the body and spaced circumferentially from one another, and brushes bearing upon the bars in close relation to rear free ends of the bars, the bars being subject to peeling at their free ends from the body in response to centrifugal forces arising from rotation of the commutator with the shaft, and the bars upon peeling being subject to striking the brushes as the commutator rotates, the improvement comprising a collar to restrain the bars from peeling disposed between the rear end face of the commutator and the inner face of the end frame, wherein the collar has a disc body provided with an axial hole through which the shaft extends, has an inner flat face abutting the rear end face of the commutator, has a peripheral rim projecting forwardly from the disc body and overlaying the free ends of the bars, the rim serving to restrain the bars from said peeling, and the disc body has a rearwardly projecting hub provided with radiallly extending cavities in a rear face thereof, the cavities being adapted to be filled with grease for effecting lubrication of the rear face of the hub during rotation of the collar relative to the inner face of the end frame.

4. In an automotive starter motor as in claim 3, wherein the brushes are undercut in rear portions thereof, and the undercut portions overhang with clearance the rim of the collar.

* * * * *